United States Patent
Kurtz et al.

[11] Patent Number: 6,058,782
[45] Date of Patent: May 9, 2000

[54] HERMETICALLY SEALED ULTRA HIGH TEMPERATURE SILICON CARBIDE PRESSURE TRANSDUCERS AND METHOD FOR FABRICATING SAME

[75] Inventors: Anthony D. Kurtz, Ridgewood; Alexander A. Ned, Wayne, both of N.J.

[73] Assignee: Kulite Semiconductor Products, Leonia, N.J.

[21] Appl. No.: 09/160,976

[22] Filed: Sep. 25, 1998

[51] Int. Cl.[7] ................................................ G01L 9/06
[52] U.S. Cl. ............................................................ 73/727
[58] Field of Search .......................... 73/708, 721, 727, 73/777, 862.627; 252/521, 519.13; 338/2, 4, 42, 47; 374/185; 257/76, 27, 215, 418, 421

[56] References Cited

U.S. PATENT DOCUMENTS

| | | | |
|---|---|---|---|
| 4,994,781 | 2/1991 | Sahagen | 338/47 |
| 5,174,926 | 12/1992 | Sahagen | 252/519.13 |
| 5,536,953 | 7/1996 | Dreifus et al. | 257/77 |

Primary Examiner—William Oen
Attorney, Agent, or Firm—Arthur L. Plevy

[57] ABSTRACT

An apparatus and method for making ultra high temperature silicon carbide pressure transducers which prevents the deterioration of contact areas under harsh conditions, such as high temperatures and oxidizing atmospheres includes a first substrate of silicon carbide with a plurality of piezoresistive elements disposed on a central active region. A plurality of generally L-shaped contact areas extend from and substantially surround the central active region. On each contact area a metalized contact is formed. An isolation moat etched around the periphery of the first substrate separates each contact area from the other, and separates the contact areas from the periphery of the device. A second substrate of silicon carbide having a plurality of apertures extending therethrough which align with and correspond to a contact on each contact area is joined to the first substrate by electrostatic bonding or by employing a glass frit. The apertures are then filled with a glass metal frit mixture which includes platinum to provide a hermetic seal of the sensor element. A gold-plated pin or spherical contact is inserted into the glass metal frit filled apertures, and the entire structure is fired to solidify the glass metal frit.

20 Claims, 4 Drawing Sheets

HERMETICALLY SEALED ULTRA HIGH TEMPERATURE SILICON CARBIDE PRESSURE TRANSDUCERS AND METHOD FOR FABRICATING SAME

BACKGROUND OF THE INVENTION

1. Field of the Invention

This invention relates to semiconductor transducers and in particular, to a hermetically sealed ultra high temperature silicon carbide pressure transducer and method for fabricating the same.

2. Description of Related Art

Semiconductor pressure transducers are employed in the measurement of pressure in numerous types of applications and environments. Many pressure transducers employ a relatively thin diaphragm fabricated from semiconductor material such as silicon. Upon the diaphragm is deposited or diffused a piezoresistive strain gage configuration, such as a bridge circuit, whereby the resistors associated with the bridge exhibit a change in resistance according to a deflection in the diaphragm. By monitoring the change in resistance, one obtains an output voltage indicative of the applied pressure or force.

Pressure transducers capable of operating at high temperatures of at least 600° C. and having small physical dimensions are highly desired in various applications. High temperatures can be associated with high pressure environments. Contact areas of transducers generally are formed of metal which can oxidize. Thus, the nature of the operating environment results in prolonged exposure of both the metalization of the transducers and the lead attachments to high temperature in an oxidizing atmosphere.

Formerly, monolithic sensors fabricated integrally with a silicon diaphragm and operating temperatures of about 350° F. would deteriorate due to thermally generated carriers which served to short circuit the sensors to the substrate, because isolation of the silicon stress sensors from the force collecting structure by PN junctions in these monolithic devices deteriorated as a function of temperature. T avoid this problem, dielectrically isolated sensors were fabricated. For example, see U.S. Pat. No. 3,800,264 to A. D. Kurtz et al., entitled HIGH TEMPERATURE TRANSDUCERS AND HOUSING INCLUDING FABRICATION METHODS. See also U.S. Pat. No. 3,930,823 to Kurtz et al., entitled HIGH TEMPERATURE TRANSDUCERS AND HOUSING INCLUDING FABRICATION METHODS, both assigned to Kulite Semiconductor Products, Inc., the assignee herein. These devices provide dielectric isolation of the sensor from the diaphragm and operate at temperatures in excess of 500° C. When temperatures reach above 600° C., however, the silicon sensing network and the silicon force collector undergo significant plastic deformation rendering the device useless as a pressure transducer.

To overcome this problem, high temperature transducers employing silicon carbide have been fabricated. For example, see U.S. Pat. No. 5,165,283 to A. D. Kurtz et al., entitled HIGH TEMPERATURE TRANSDUCERS AND METHODS OF FABRICATING SAME EMPLOYING SILICON CARBIDE, assigned to the assignee herein. A heteroepitaxial growth process for growing alpha silicon carbide in the fabrication of pressure transducers having a diaphragm fabricated from one type of silicon carbide and a sensor fabricated from another type of silicon carbide is described in the patent. These transducers are capable of operating at extremely high temperatures in excess of 600° C.

Problems in employing semiconductor pressure transducers at elevated temperatures includes the deterioration of the stress sensing network due to the high temperature, and oxidizing atmospheres leading to corrosion due to the presence of oxygen in the environment an the reactive metal contact areas. Methods enabling the transducer to remain operational in these corrosive and high temperature environments involve exposing the backside of the transducer to ambient pressure while hermetically sealing the stress sensing network on the active portion of the diaphragm. Such a method is described in co-pending U.S. application Ser. No. 08/711,078 filed Sep. 9,1996, which is a continuation of Ser. No. 08458,405, filed Jun. 2, 1995, entitled HEMETICALLY SEALED TRANSDUCERS AND METHODS FOR PRODUCING THE SAME by A. D. Kurtz and assigned to Kulite Semiconductor Products, the assignee herein. The hermetic seal is formed by glass frit bonding a cover member having a central aperture to a transducer wafer. While in a vacuum environment the aperture is sealed, thereby maintaining a vacuum between the transducer element and the cover. A portion of the electrical contact is left exposed to enable subsequent wire bonding thereto.

One of the major problems in employing silicon carbide in pressure transducers at elevated temperatures and in oxidizing atmospheres is the deterioration of the contact areas. Contact areas are generally formed of materials such as titanium and tantalum silicide which are overcoated platinum. Fine gold wire bonds are then attached metalized contacts by ultrasonic ball bonding. The opposite end of the gold wire is frequently bonded to a gold-plated nickel or KOVAR pin in the header assembly. An example of a header assembly is found in. U.S. Pat. No. 4,764,747 to Kurtz et al., assigned to the assignee herein.

Although the technique of forming contact areas of titanium and tantalum silicide overcoated with platinum has bee useful for short terms, under prolonged exposure to harsh environments, the metal layers are attacked and oxidized. Moreover, the gold from the ultrasonic bond on the silicon carbide contact area may diffuse through the contact metalization into the underlying silicon carbide thereby resulting in device failure. In addition, the gold bond to the gold-plated pin also deteriorates due to the diffusion of the gold into the pin and the subsequent oxidation thereof. Techniques for hermetically sealing the sensing network from hostile environments have heretofore limited the size of the transducers produced, since additional lateral space was required in accommodating a sealing cover structure.

There remains a need for ultra high temperature silicon carbide pressure transducers and method of making the same which prevent the deterioration of the contact area when exposed to high temperatures of 600° C. or grater and to oxidizing atmospheres which extends the useful life and optimizes the yield of transducers produced and eliminates the need for gold wires ultrasonically bonded to the contact areas and to header pins.

In addition affixing a silicon-carbide sensor diaphragm directly to a header or sealing it to a glass structure before affixing it to a header gives rise another problem because of the large mismatch of thermal expansion coefficients between the silicon carbide sensor diaphragm and either the header material or the glass structure. This causes thermally induced strain in the sensor and contributed to a measurement error.

SUMMARY OF THE INVENTION

There is herein disclosed a new advantageous method for making ultra high temperature silicon carbide pressure transducers. Kulite has previously made and patented a group of methods for obtaining thin silicon carbide diaphragms with a group of piezoresistive sensors on one surface. One of the major problems, however, in using the silicon carbide pressure transducers at elevated temperatures was the deterioration of the contact areas when exposed to high heat and oxidizing atmospheres. In the previous art, the contact areas are usually made of such materials as titanium and tantalum silicide overcoated with platinum to which fine gold wire bonds were attached by ultrasonic ball bonding. The other end of the gold wire was frequently bonded to a gold plated nickel or Kovar pin in the header assembly. While this technique was very useful, under prolonged exposure to high temperature in a oxidizing atmosphere, the gold from the ultrasonic bond on the silicon carbide contact area could diffuse through the contact metallization into the underlying silicon carbide resulting in a device failure. Moreover, under prolonged exposure to the same ambient conditions, the gold bond to the gold plated Kovar pin would also deteriorate because of diffusion of the gold into the Kovar and the subsequent oxidization of the Kovar pin. It is with the above in mind that a new method of device construction by employed. This consists of fabricating a silicon carbide sensor similar to the previously disclosed units with the following exceptions.

1) The contact fingers are greatly enlarged but each one separated from the other by an etched moat.

2) There will be a rim surrounding the entire device coplanar with the contact areas but separated from this by a second moat.

3) A small central section of each of the four contact areas is now metallized with an appropriate high temperature contact metal such as titanium/tungsten or other appropriate high temperature contacts.

4) A second piece of silicon carbide is provided with apertures to match and be slightly larger than the metallized contact areas on the first piece. The second piece also has a slight depression opposite the deflecting portion of the first slice to allow the first slice to deflect under pressure. It is possible to anodize the second wafer particularly the areas in the aperatures and re-heat the wafer turning the anodized porous silicon carbide into Silicon Dioxide, an ultra high temperature isolation.

5) The two slices may now be joined together using either electrostatic bonding or a glass frit such as pyroceram. It should be noted that when the two slices are sealed together, the seal is made only to the rim and the portion of the contact area not including the metalized area in the center of the contact area effectively providing hermetic seal of the entire sensor with the sensing portion of the sensor within the hermetically sealed area. The composite slice structure may now be sectioned to yield individual composite sensor structure or dice.

6) To mount the individual composite sensor structure to a header assembly, one may now fill the apertures in the second slice with the high temperature metal glass frit such as a mixture of pyroceram and platinum or platinum palladium silver or some other high temperature mixture without gold, in an unfired state. This has an unanticipated advantage because the use of the platinum frit avoids the presence of any gold in contact with the metallic contact area. Moreover, this material also enables one to use what could be considered an oxidizable metal contact layer since the platinum frit effectively prevents any air from reaching the underlying metallic surface. Another unanticipated advantage is the use of the second silicon carbide piece to which the sensor slice is mounted. Not only does this provide for a perfectly matched thermal expansion coefficient but the ability to obtain silicon carbide of very high resistivity, as well as the anodized and re-heated aperatures enables one to insure that the contacts remain electrically isolated from one another. The device is now ready to be mounted to a high temperature header using very short length pins. The pins protrude into the apertures and make contact with the unfired platinum frit. At the same time, the region outside the aperture is coated with a pyroceram-like material without any metal particles.

7) The structure can now be fired and as the pyroceram reaches temperature it will not only seal the inner and outer surface of the die to the header but will also serve to solidify the pyroceram platinum metal frit forming an intimate bond between the header pin and the metallized contact layer in the first layer of the device. Such a "leadless device" will exhibit none of the previously seen problems encountered in high temperature ambient conditions in previous art devices.

DETAILED DESCRIPTION OF THE INVENTION

During the course of this description, like numbers will be used to identify like elements according to the different views that illustrate the invention.

Figure 1:
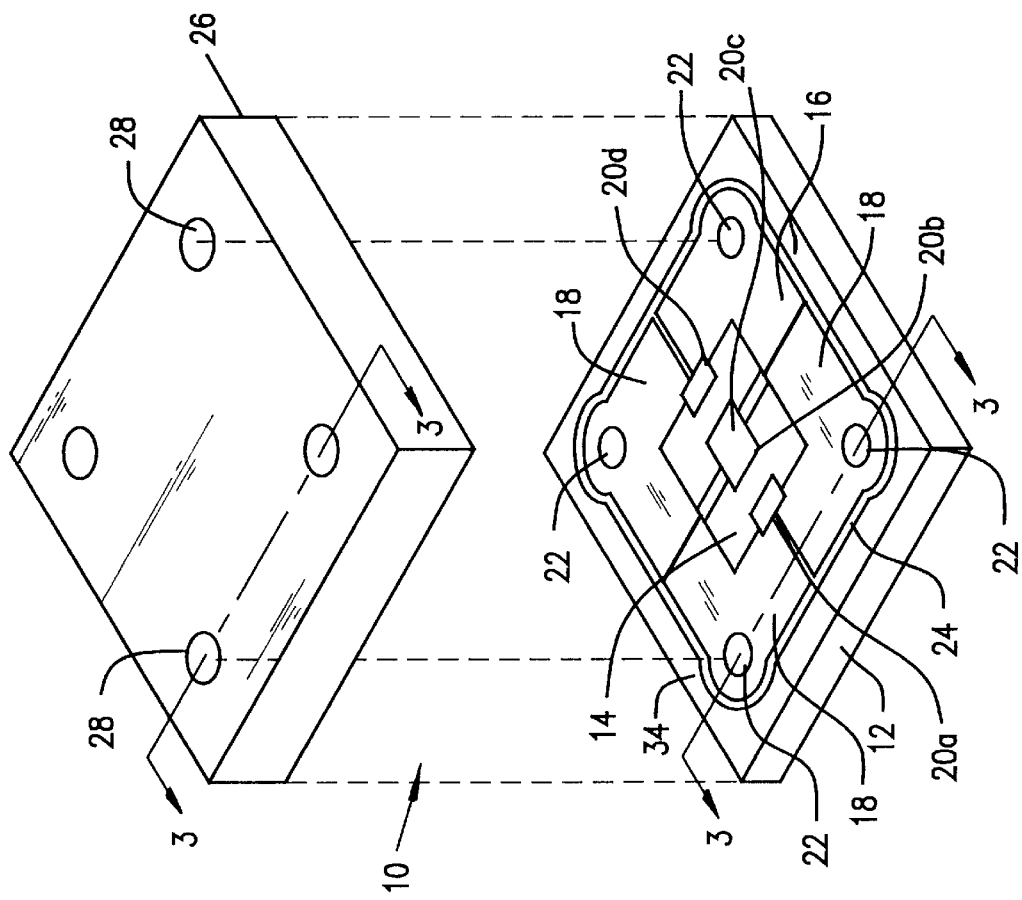
FIG. 1 is an exploded front view of the apparatus.

The preferred embodiment of the invention 10 is illustrated in FIG. 1. The pressure transducer 10 is shown in an exploded view to depict the features of the first silicon carbide substrate 12 apart from the second substrate of the silicon carbide 26. The first 12 and second 26 substrates of silicon carbide are fabricated according to the techniques disclosed in U.S. Pat. No. 5,165,283 to A. D. Kurtz et al., entitled HIGH TEMPERATURE TRANSDUCERS AND METHODS OF FABRICATING THE SAME EMPLOYING SILICON CARBIDE, assigned to the assignee herein, the disclosure of which is incorporated herein by reference. The pressure transducer 10 is approximately 100 mils in width by 100 mils in lengths. Although the transducers are shown having square geometry, it is to be understood that geometries other than square can be used for the first 12 and second 26 silicon carbide substrates.

The first substrate 12 has a central active region 14 which is surround by a non-active region 16. Active area 14 deflects upon the application of a force. The non-active region 16 external to the active region 14 is conventionally termed "non-active" as it is more rigid than the active region 14. A plurality of enlarged contact areas 18 are formed on the first substrate 12. Sensor elements 20a–20d of silicon carbide are integrally formed in the active portion 14 by conventional techniques, such a epilaxial growth. The sensor elements 20a–20d are electrically isolated from the first substrate of silicon carbide 12 by a series of P-N junctions and are etched to define their geometry using electrochemical anodization techniques described in U.S. Pat. No. 5,165,283 to A. D. Kurtz et al., entitled HIGH TEMPERATURE TRANSDUCERS AND METHODS OF FABRICATING THE SAME EMPLOYING SILICON CARBIDE, assigned to the assignee herein, the disclosure of which is incorporated herein by reference. Each piezoresistor 20a–20d consists of a thin line width section and a wider region of material leading to the contact areas, each having a width between 0.1 and 1.0 mils. Each sensor element 20a–20d is essentially a variable resistor in one of four legs of a Wheatstone bridge circuit with each of the respective resistances varying in proportion to an applied force or pressure to the active portion 14 of the transducer 10.

The circuit nodes of the Wheatstone bridge consist of four enlarged contact areas 18 which extend from and surround the sensor elements 20a–20d. each contact area or finger 18 mainly located in the non-active region 16 of the transducer 10 is approximately ten times larger in dimension than the piezoresistive sensing element 20a–20d.

Metal contacts 22 are centrally located in the non-active region 16 and at least one metallized contact 22 is located on each contact area 18. As seen in FIG. 1, four contacts 22 are shown. Contacts 22 are circular in shape and are each approximately 10 mils in diameter. Each contact 22 is metalized with a high temperature contact metal such as titanium and/or tungsten and tantalum silicide and overcoated with platinum or other high temperature contact metals, by using conventional techniques.

An isolation moat 24 is etched around each contact area 18 and around the periphery 34 of the first substrate 12. Isolation moat 24 serves to electrically isolate the contact areas 18 from each other, and separates all the contact areas 18 from near the periphery 34 of the first substrate 12 having dimensions along the order of magnitude of the line width of the sensor elements 20a–20d. The isolation moat 24 etched around the periphery 34 provides an area of approximately 0.5 mils in width.

The periphery or rim 34 of the first substrate 12 has a width of approximately 10–15 mils. The smooth surface of the rim 34 is coplanar with the contact areas 18 but is separated from them by the etched isolation moat 24. The isolation moat 24 defines the periphery 34 is etched in a semi-circular or rounded manner around each contact 22 where the width from the etching to the edge of the first substrate 12 is approximately 10 mils. Between each contact 22 and along each side of the first substrate 13, the etching following a generally straight line and further defines the periphery 34 having a width of approximately 15 mils.

Figure 2:
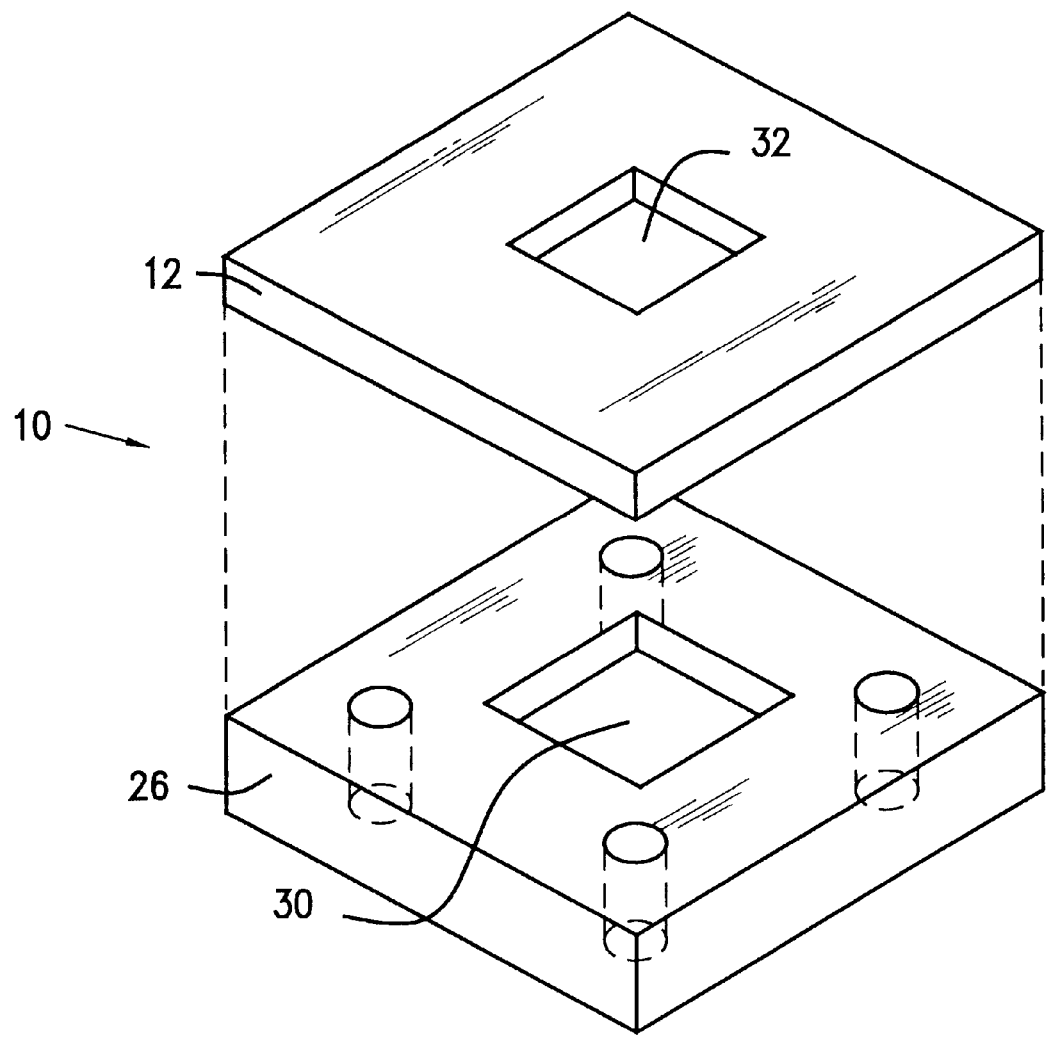
FIG. 2 is an exploded inverted view of the apparatus.

The second substrate of silicon carbide 26 has a plurality of apertures 28 which extend therethrough. Four apertures 28 are shown in FIGS. 1 and 2. Each aperture 28 aligns with and corresponds to a metal contact 22 on the first substrate 12. Apertures 28 are sized to be slightly larger than the contacts 22 on the first substrate 12, but are dimensioned to be smaller than the contact areas 18 to ensure a hermetic seal. Accordingly, each aperture 28 is fabricated to be slightly more than 10 mils in diameter near the bottom surface of the second substrate 26 and increases in diameter as it reached the top surface. The tapered shape of the apertures 28 is for receiving and securing a corresponding header pin 36 be received therein, and for ease in filling the apertures 28.

Referring to FIG. 2, the silicon carbide pressure transducer 10 is shown inverted in an exploded view. As shown, first substrate 12 has a depression 32 formed in the bottom surface of substrate 12. The area above the aperture 32 on the top surface substrate 12 is the active or deflecting portion 14 of the diaphragm where sensor elements 20a–20d are formed.

Second substrate 26 has a slight depression or cutaway portion 30 opposite the deflecting portion of the first substrate 12 to allow for deflection of the first substrate 12 upon the application of pressure thereon. Depression 30 has a predetermined depth, which depends upon the magnitude of the deflection of the active portion 14 of the first substrate 12. The second substrate 26 of silicon carbide has a perfectly matched thermal expansion coefficient to the first substrate 12 and the silicon carbide employed is of very high resistivity.

The first substrate 12 and second substrate 26 are joined by electrostatic bonding or with a glass frit 46 such as a high temp glass material manufactured by Corning Glass, in Corning, N.Y. Having a softening point higher than conventional glass, this glass material thermosets and devitrifies at temperature above 550° C. Upon devitrification, the glass develops a crystalline structure thereby resulting in a strong seal. The seal to the periphery 34 and to the contact areas 18 effectively provides hermetic seal of the sensor elements 20a–20d. Upon completion of the electrostatic or glass frit bonding and firing operations, the transducer is now hermetically sealed and the resulting wafer having a multiplicity of elements can be cut into individual dice. The transducer 10 is shown in dice form as an example of one chip that is formed.

Figure 3:
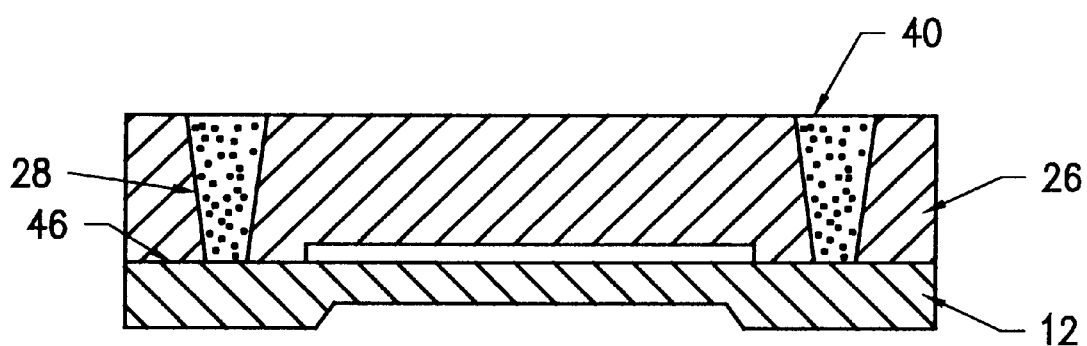
FIG. 3 is cross-sectional view of the apparatus along line 3—3 of FIG. 1 for mounting on a circuit board.

After joining the first and second substrates together, the apertures 28 in the second substrate 26 are filled with a high temperature conductive glass metal frit 40 consisting of a mixture of glass and metal powder such as platinum palladium silver in an unfired state as shown in FIG. 3 or similar material with a high temperature metal. This mixture ensures proper electrical contact. The glass metal frit 40 may be made with PYROCERAM, a glass material manufactured by Corning Glass Co. (the area surrounding the apertures 28 is also coated with a material devoid of metal particles which comprises PYROCERAM).

The PYROCERAM glass metal frit mixture 40 is prepared by mixing the finely powdered PYROCERAM glass and platinum with a suitable suspension vehicle, such as nitrocellane and anylacerate, to a desired consistency to form a paste-like mixture of platinum-glass fit. The paste-like mixture is then injected into each aperture 28 of the second substrate 26 using any suitable method. By employing the glass high temperature metal frit 40, air is effectively prevented from reaching the underlying surface thus enabling the one to use an oxidizable metal contact substrate without being exposed to the oxidizing atmospheres in the operating environment. The transducers 10 operate at temperatures of 600° C. or greater over an extended period of time.

Figure 4:
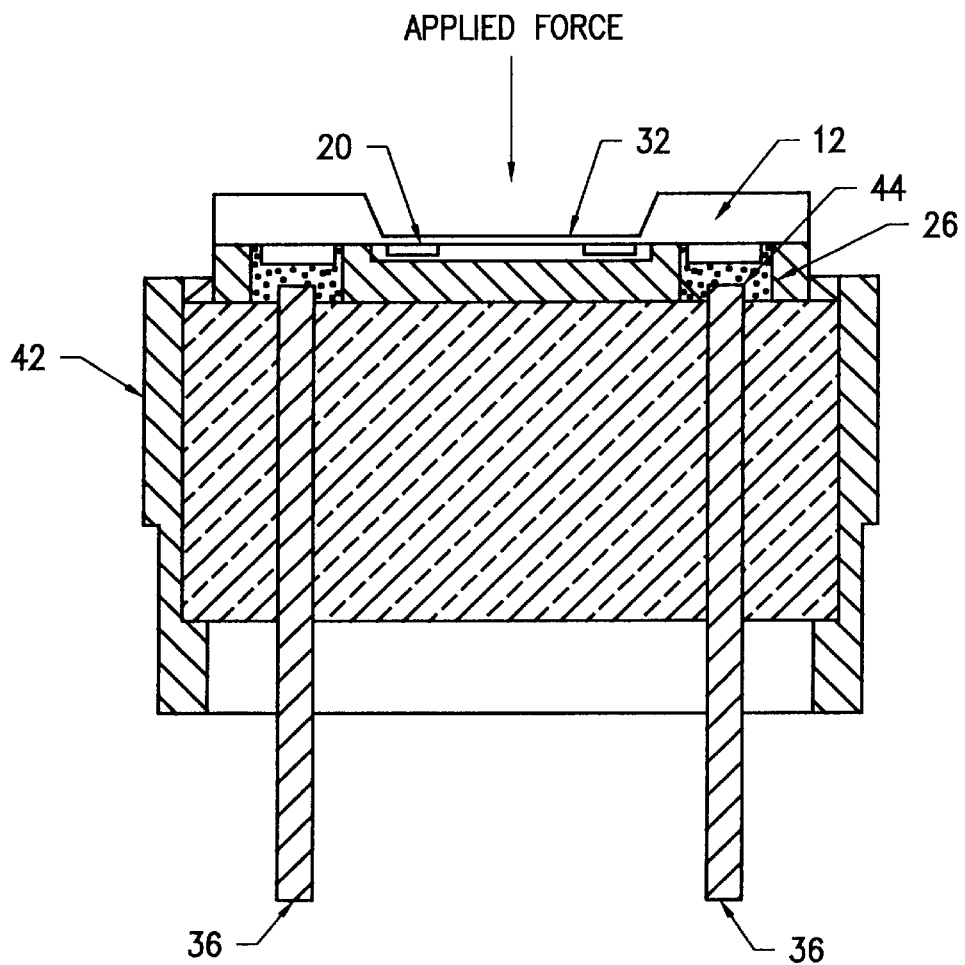
FIG. 4 is cross-sectional view of a header assembly with the apparatus mounted thereon.

Referring to FIG. 4, this shows how the device is mounted in a header assembly. Pins 36 are fabricated from nickel or KOVAR, which is a high temperature steel alloy. Head portion 44 is substantially coplanar with the top surface of the second substrate 26. Pins 36 are inserted into the filled apertures 28 of the second substrate 26 and are of sufficient length to reach essentially the contact areas 18 on the first substrate 12. The entire structure is then fired to solidify the metal frit, and to seal the inner and outer surface of the die to the header 42.

Referring to FIG. 4, the device 10 is mounted in a header assembly 42 is essentially a leadless device. Pins 36 are substantially coplanar with the second substrate 26 but protrude into it. Positioned over the header assembly 42 is a transducer 10 of the invention. Pressure is applied to the transducer 10 in the direction of the arrow.

While the invention has been described with reference to the preferred embodiment thereof, it will be appreciated by those of ordinary skill in the art that modifications can be made to the parts that comprises the invention without departing from the spirit and scope thereof.

What is claimed is:

1. A high temperature pressure transducer comprising:

a first substrate fabricated from silicon carbide having on a surface a central active region capable of deflecting and a surrounding non-active region which is more rigid than said active region;

a plurality of piezoresistive sensors elements disposed on said active region, of each sensor elements having a given line width;

a plurality of generally enlarged contact areas extending from and surrounds said sensor elements on said active region to near the periphery of said first substrate, said contact areas being generally located in said non-active region of said first substrate, each said contact areas having a smaller centrally located contact, each of said sensor elements being coupled to at least two contact areas;

an external rim on the periphery coplanar with the contact areas isolation moats for isolating said contact areas from each other and from said periphery of said first substrate, said isolation moats being dimensioned on the order of magnitude of said line width of said sensor elements; a metalized area near the center of each contact each such metalization being of a high temperature capability;

a second substrate of silicon carbide having a plurality of apertures extending therethough, each of said apertures aligned with and corresponding to the centrally located metalized contact areas;

means for joining said first substrate to said second substrate without contacting said sensor elements thereby providing hermetic seal of said sensor elements; and means for sealing said plurality of apertures while providing access to each contact.

2. The transducer of claim 1, wherein said second substrate has a depression for receiving said active region of said first substrate.

3. The transducer of claim 1, wherein said isolation moats are formed by etching.

4. The transducer of claim 3, wherein said contact is metallized with a metal selected from the group consisting of titanium tantalum platinum tungsten, etc.

5. The transducer of claim 4, wherein each of said apertures in sized larger than each of said metalized contacts.

6. The transducer of claim 5, wherein said means for sealing comprises electrostatic bonding.

7. The transducer of claim 5, where said means for sealing comprises a glass frit.

8. The transducer of claim 5, wherein said means of fillings apertures comprises a metal glass frit.

9. The transducer of claim 8, wherein said metal glass frit comprises PYROCERAM and platinum.

10. The transducer of claim 9, wherein said metal glass frit comprises a glass and a mixture metals such as platinum palladium silver.

11. The transducer of claim 10, wherein said piezoresistve sensor elements are connected in a Wheatstone bridge configuration.

12. A high temperature pressure transducer, comprising:

a first substrate fabricated from silicon carbide having on a surface a central active region capable of deflecting and a surrounding non-active region which is more rigid than said active region;

at least four piezoresistive sensor elements in a Wheatstone bridge configuration disposed on said active region, each of said sensor elements having a given line width;

at least four enlarge contact areas extending from and surrounding said sensor elements on said active region to near the periphery of said first substrate, said contact areas being generally located in said non-active region of said first substrate, each of said contact areas having a substantially smaller centrally located contact, each of said sensor elements being coupled to at least two of said contact areas;

an isolation moat for isolating said contact areas from each other, said isolation moat being dimensioned on the same order of magnitude as said line width of said sensor elements;

a periphery rim coplanar with the contact areas but separated from them with a second moat;

a second substrate of silicon carbide having at least four apertures extending therethrough which are aligned with and correspond to said at least four contacts, said second substrate having a depression for receiving the deflecting region of said first substrate; and means for joining said first substrate to said second without contacting said sensor elements thereby providing a hermetic seal of said sensor elements; and means for sealing said at least four apertures while providing access to each contact.

13. The transducer of claim 12, wherein said width of said isolation moat is about 0.1 mil to 1.0 mil.

14. The transducer of claim 13, wherein each of said contact areas are about 35–40 mils in width and length.

15. The transducer of claim 14, wherein said means for sealing comprises a metal glass frit.

16. A method of making a high temperature pressure transducer, comprising the steps of:

fabricating a diaphragm of silicon carbide with a plurality of piezoresistive sensor elements of a given line width disposed on an central active region of a surface of said diaphragm, said diaphragm capable of deflecting in said central active region, said surface of said diaphragm further including a surrounding non-active region which is more rigid than said central active region;

forming a plurality of enlarged contact areas on said active region extending from and surrounding said sensor elements to the peripheral surface of said diaphragm, and a small metalized contact centrally located on each of said contact areas, said sensor elements being coupled to at least two of said contact areas;

forming a depression in a substrate of silicon carbide for receiving the deflecting portion of said diaphragm, and plurality of apertures extending therethrough aligned with and corresponding to each contact on said contact areas;

joining said peripheral surface and said contact regions of said diaphragm to said substrate of silicon carbide without contacting said sensor elements thereby providing a hermetic seal for said sensor elements while providing access to said metalized contacts.

17. The method of claim 16, wherein said apertures are sized larger than said metalized contacts.

18. The method of claim 17, wherein said moat is dimensioned on the same order of magnitude as the line width of said sensor elements.

19. The method of claim 18, wherein said apertures are sealed with a metal glass frit.

20. The method of claim 19, wherein the width of said moat is about 1.0 to 1.0 mils.

* * * * *